US009345322B1

(12) United States Patent  
Starnes

(10) Patent No.: US 9,345,322 B1  
(45) Date of Patent: May 24, 2016

(54) HANGING GUN MOUNT

(71) Applicant: Michael H. Starnes, Thomasville, NC (US)

(72) Inventor: Michael H. Starnes, Thomasville, NC (US)

( * ) Notice: Subject to any disclaimer, the term of this patent is extended or adjusted under 35 U.S.C. 154(b) by 0 days.

(21) Appl. No.: 14/285,821

(22) Filed: May 23, 2014

(51) Int. Cl.
| *A47B 81/00* | (2006.01) |
| *B60R 7/10* | (2006.01) |
| *A47G 25/14* | (2006.01) |
| *E05B 69/00* | (2006.01) |

(52) U.S. Cl.
CPC .............. *A47B 81/005* (2013.01); *A47G 25/14* (2013.01); *B60R 7/10* (2013.01); *E05B 69/006* (2013.01)

(58) Field of Classification Search
CPC ........... F41C 33/08; A47B 8/005; B60R 7/10; A47G 25/14; E05B 69/006; Y10S 224/913
USPC ......... 248/682, 687, 690, 692, 304, 317, 340, 248/316.1, 316.6, 62, 58, 68.1, 72; 211/85.3, 64; 223/88, 95
See application file for complete search history.

(56) References Cited

U.S. PATENT DOCUMENTS

| 1,547,951 | A |   | 7/1925  | Olson |
| 1,674,043 | A | * | 6/1928  | Hoffman ................ A47G 25/20 223/91 |
| 1,756,642 | A |   | 4/1930  | Horne |
| 1,848,800 | A |   | 3/1932  | Pennefather |
| 1,982,166 | A |   | 11/1934 | Hultquist ........................ 223/61 |
| 2,130,497 | A | * | 9/1938  | Hueglin ......................... 248/635 |
| 2,255,973 | A | * | 9/1941  | Hoobler ................ 211/119.007 |
| 2,522,013 | A |   | 9/1950  | Anderson ........................ 223/93 |
| 2,567,463 | A | * | 9/1951  | Atkinson ...................... 248/68.1 |
| D167,836  | S |   | 9/1952  | Kandarian ........................ D80/8 |
| 2,615,602 | A |   | 10/1952 | Thompson et al. ............. 223/87 |
| 2,645,357 | A | * | 7/1953  | Taylor et al. ................... 211/117 |
| 2,880,949 | A | * | 4/1959  | Fuss ................................ 248/70 |
| 2,998,903 | A | * | 9/1961  | Day ....................... A47G 25/14 223/68 |
| 3,042,217 | A | * | 7/1962  | Shores .................... D06F 73/00 211/119 |
| 3,116,860 | A |   | 1/1964  | Urich .............................. 223/85 |
| 3,468,508 | A |   | 9/1969  | Huver ........................... 248/314 |
| 3,547,385 | A | * | 12/1970 | Kindorf et al. .................. 248/62 |
| 3,857,491 | A | * | 12/1974 | Townsend et al. ................ 211/8 |
| 4,132,315 | A |   | 1/1979  | Young ............................. 211/4 |
| 4,209,157 | A |   | 6/1980  | Edmisten ...................... 248/360 |
| 4,309,065 | A |   | 1/1982  | Pappas ......................... 312/319 |
| 4,363,430 | A | * | 12/1982 | Radlin ............................ 223/88 |
| 4,624,372 | A | * | 11/1986 | Brolin ............................. 211/4 |
| 4,747,280 | A |   | 5/1988  | Shaw ............................. 70/279 |
| 5,022,534 | A |   | 6/1991  | Briggs ............................. 211/4 |
| 5,282,539 | A |   | 2/1994  | Saathoff ......................... 211/64 |
| 5,438,787 | A |   | 8/1995  | McMaster et al. ............. 42/106 |
| 5,520,291 | A |   | 5/1996  | Graham ........................... 211/4 |
| 5,676,257 | A |   | 10/1997 | Adkins ............................ 211/4 |
| 5,794,898 | A | * | 8/1998  | Bradley et al. ................ 248/102 |
| 5,887,730 | A | * | 3/1999  | St. George ....................... 211/4 |

(Continued)

*Primary Examiner* — Anita M King  
(74) *Attorney, Agent, or Firm* — Blake P. Hurt; Tuggle Duggins P.A.

(57) ABSTRACT

A gun mount concealable under a garment including a hanger with a hook attached to a longitudinal member defining a central channel for receiving opposing threaded ends of a mount loop. One mount loop end passes through the trigger assembly and engages a washer and nut on the opposing side of the gun mount via the central channel and the other mount loop end is positioned within the central channel. The mount may be placed in a closet among a user's wardrobe, affording secure storage to personal firearms in the event of an emergency while concealing the presence of the guns to unauthorized users.

20 Claims, 5 Drawing Sheets

(56) References Cited

U.S. PATENT DOCUMENTS

| | | | |
|---|---|---|---|
| 6,523,374 B1 | 2/2003 | Owens | 70/63 |
| 6,808,093 B1 * | 10/2004 | Lin et al. | 223/85 |
| 7,015,815 B1 | 3/2006 | Feibelman | 340/572.8 |
| 7,047,771 B2 | 5/2006 | Tanos | 70/16 |
| 7,578,492 B2 * | 8/2009 | Darre' | 248/477 |
| 7,584,861 B2 | 9/2009 | Werner | 211/64 |
| D633,978 S | 3/2011 | Vande Noord | D22/108 |
| 7,931,244 B1 * | 4/2011 | Sipe | 248/229.2 |
| D643,358 S | 8/2011 | McDonald | D12/407 |
| 8,020,332 B2 | 9/2011 | Giebel et al. | 42/70.11 |

* cited by examiner

HANGING GUN MOUNT

FIELD OF THE INVENTION

The invention herein pertains to firearm accessories and particularly pertains to a hanging handgun mount that provides secure storage for one or more handguns and may be concealed under garments found in the typical closet when access to the gun or guns is not desired.

DESCRIPTION OF THE PRIOR ART AND OBJECTIONS OF THE INVENTION

The importance of personal security, particularly in one's house cannot be overstated. As municipal and state budgets are trimmed to address funding shortcomings, civil services are continually asked to do more with less. Fire and police services are but two examples of public servants who have seen their resources reduced but are expected to continue to provide services to their respective communities. Often, reduced resources leads to increased response time and, in emergency cases, the need for citizens to resolve issues on their own. The right to possess and use firearms is generally viewed as protected under the $2^{nd}$ Amendment, but there are numerous logistical and safety reasons for not doing so. Even well-trained firearm owners may experience firearm accidents, which is but one reason why secure storage devices such as gun safes are so common. Unfortunately, locking a firearm in a safe hinders the ability to access and use said firearm in the case of an emergency such as a break-in. By the same token, gun owners in proximity to children would never leave an unsecured firearm accessible to the children.

Thus, in view of the problems and disadvantages associated with prior art firearm storage devices and methods, the present invention was conceived and one of its objectives is to provide a firearm storage device that provides easy access to handguns but remains concealed when not in use.

It is another objective of the present invention to provide a gun-securing hanger positioned in a closet that may be substantially concealed by a garment such as a shirt or coat.

It is still another objective of the present invention to provide a hanging gun mount that includes a channel and at least one adjustable loop for securing a pistol.

It is yet another objective of the present invention to provide a gun mount with one or more strips of protective padding to prevent damaging both the gun and the mount.

It is a further objective of the present invention to provide a gun-securing hanger capable of adjustably affixing two handguns thereto.

It is still a further objective of the present invention to provide a hanging gun mount formed from wood that is inexpensive to manufacture and simple to use.

It is yet a further objective of the present invention to provide an integrated garment hanger and gun mount.

It is another objective of the present invention to provide a hanging gun mount with a loop positioned behind the trigger mechanism of a hanging gun, serving as an added safety feature that obstructs the trigger from being inadvertently engaged.

Various other objectives and advantages of the present invention will become apparent to those skilled in the art as a more detailed description is set forth below.

SUMMARY OF THE INVENTION

The aforesaid and other objectives are realized by providing a concealable handgun mount with a longitudinal member defining a central channel sized to receive at least one adjustable loop and affixed to a triangular-shaped garment hanger including a hook. One or more strips of protective, cushioning material are attached to the longitudinal member, protecting both the mount, which may be formed out of wood, and the attached gun from being scratched, scuffed, or otherwise damaged. One or more guns may be secured to the mount with a loop defining a flange and a pair of threaded ends. One threaded end is sized to engage a washer and a wing nut, and the other threaded end is received by the central channel and provides structural stability for securing a handgun, for example to prevent rotation when the loop is passed through the trigger assembly of a pistol. Depending on the size of the longitudinal member and the firearms involved, two or more handguns may be secured to the mount and concealed under a garment such as a sweater or coat, providing a user with a safe and efficient way to secure firearms while also providing easy access to home defense weapons in the event of a break-in or other emergency.

DETAILED DESCRIPTION OF THE PREFERRED EMBODIMENT AND OPERATION OF THE INVENTION

Figure 1:
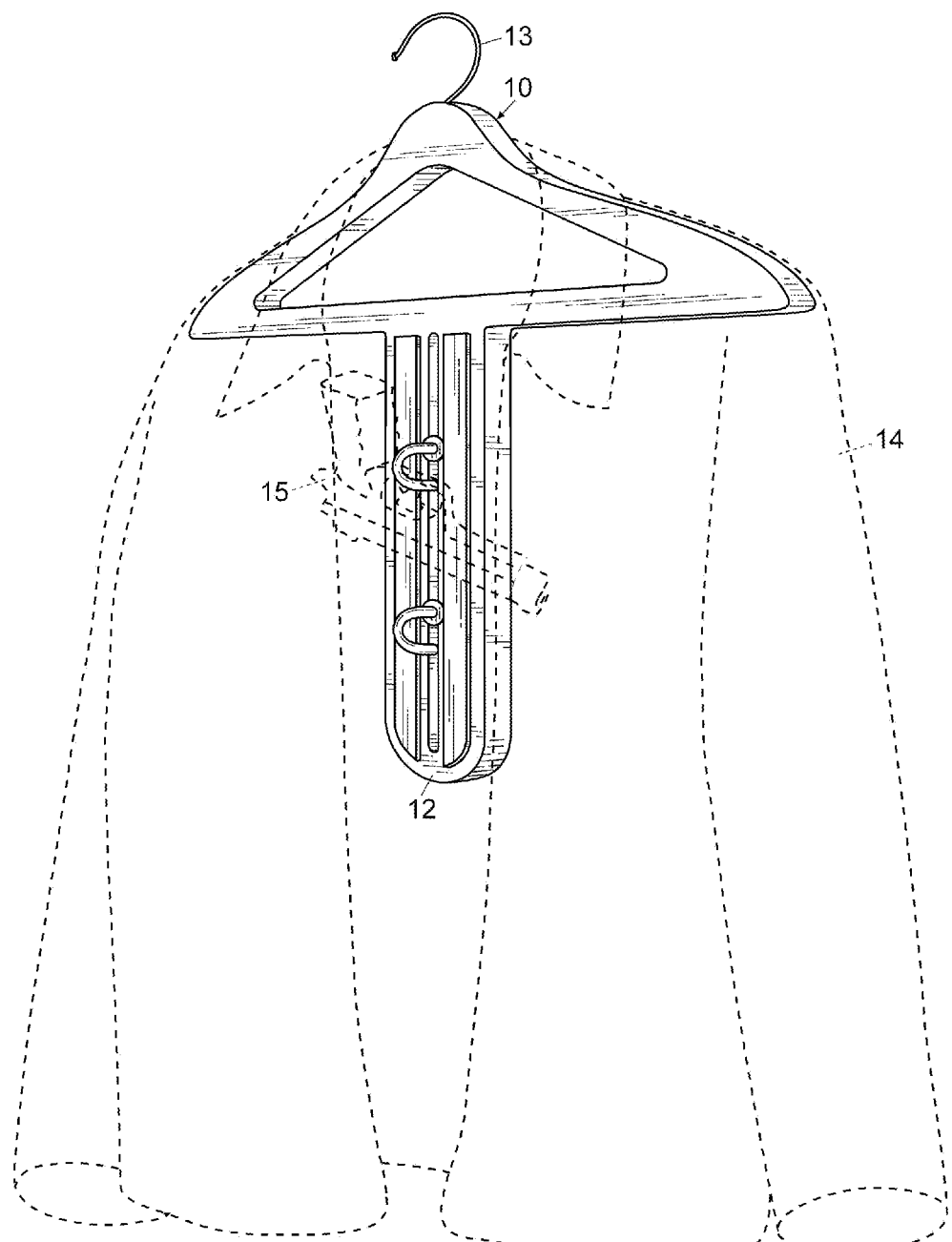
FIG. 1 shows a perspective side view of a gun mount concealed under a garment and securing a pistol.

For a better understanding of the invention and its operation, turning now to the drawings, FIGS. 1-6 illustrate preferred gun mount 10 including hanger 11, longitudinal member 12, and hook 13. FIG. 1 shows a perspective side view of gun mount 10 concealed under garment 14 and securing gun 15, which are illustrated with dotted lines to reveal the orientation and structure of gun mount 10 more clearly. As would be understood, garment 14 can be any article of clothing that resides on hanger 11 and conceals longitudinal member 12 and gun 15, for example shirts, pants, jackets, sweaters, coats, and the like. Although gun 15 is represented as a flat-sided pistol, other configurations of hand guns such as revolvers and short-barreled long guns are also contemplated within the scope of the instant invention. The use of gun mount 10 in combination with garment 14 is preferred, as garment 14 conceals gun 15 from unauthorized users, children, thieves, and the like. Garment 14 also permits a user to utilize gun mount 10 in environments where the announced or overt presence of gun 15 is undesirable.

Figure 2:
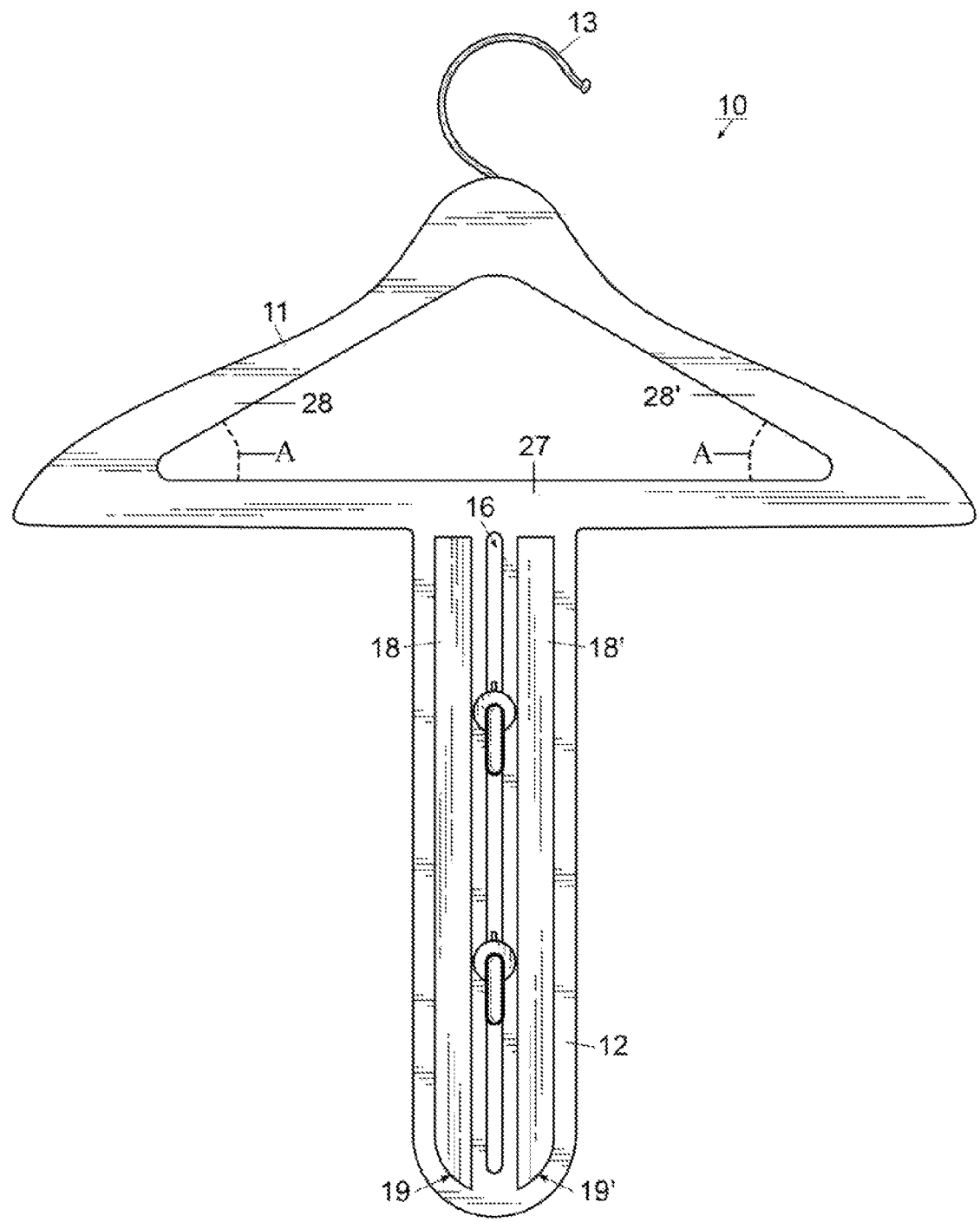
FIG. 2 pictures an elevated front view of the gun mount of FIG. 1.
Figure 3:
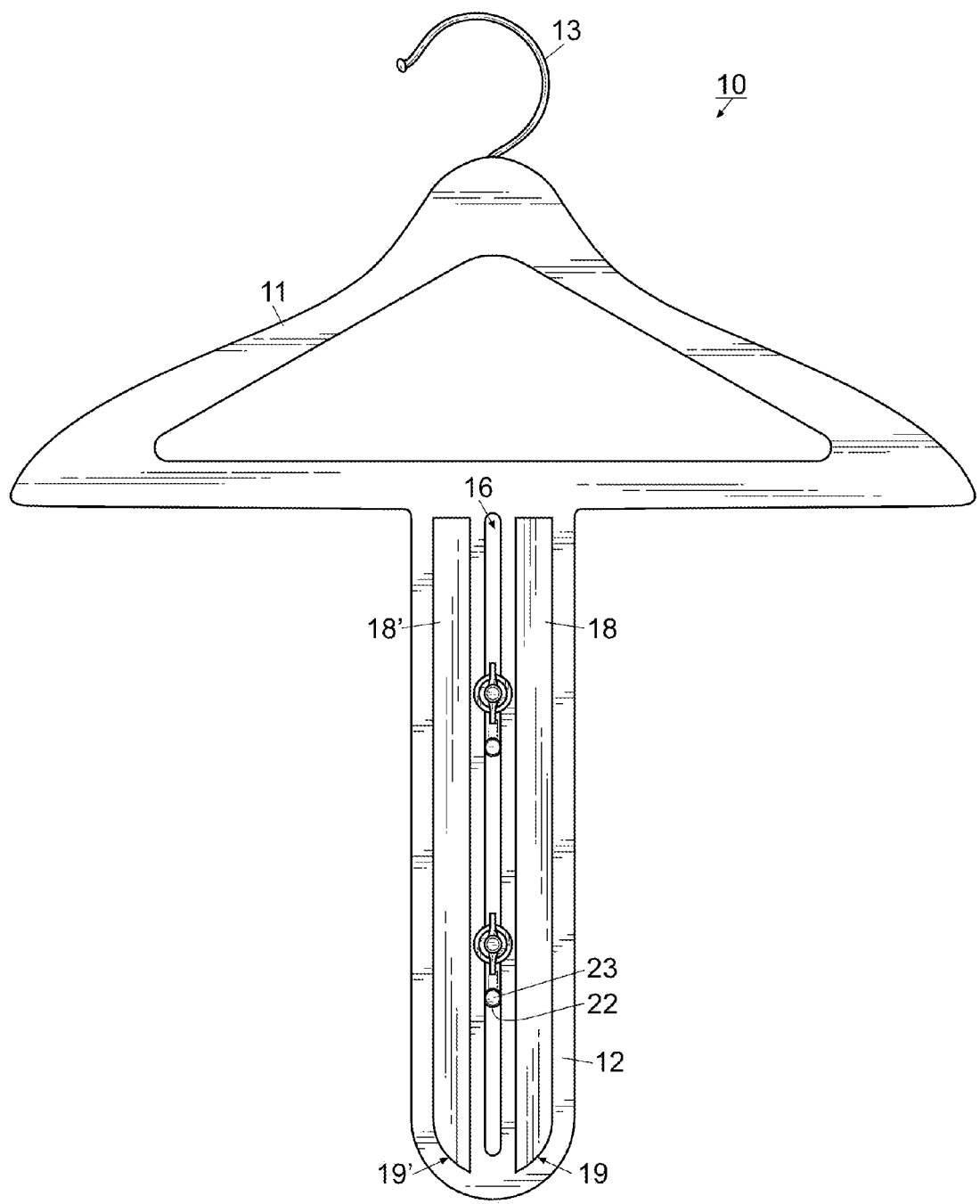
FIG. 3 depicts an elevated rear view of the gun mount of FIG. 1.
Figure 4:
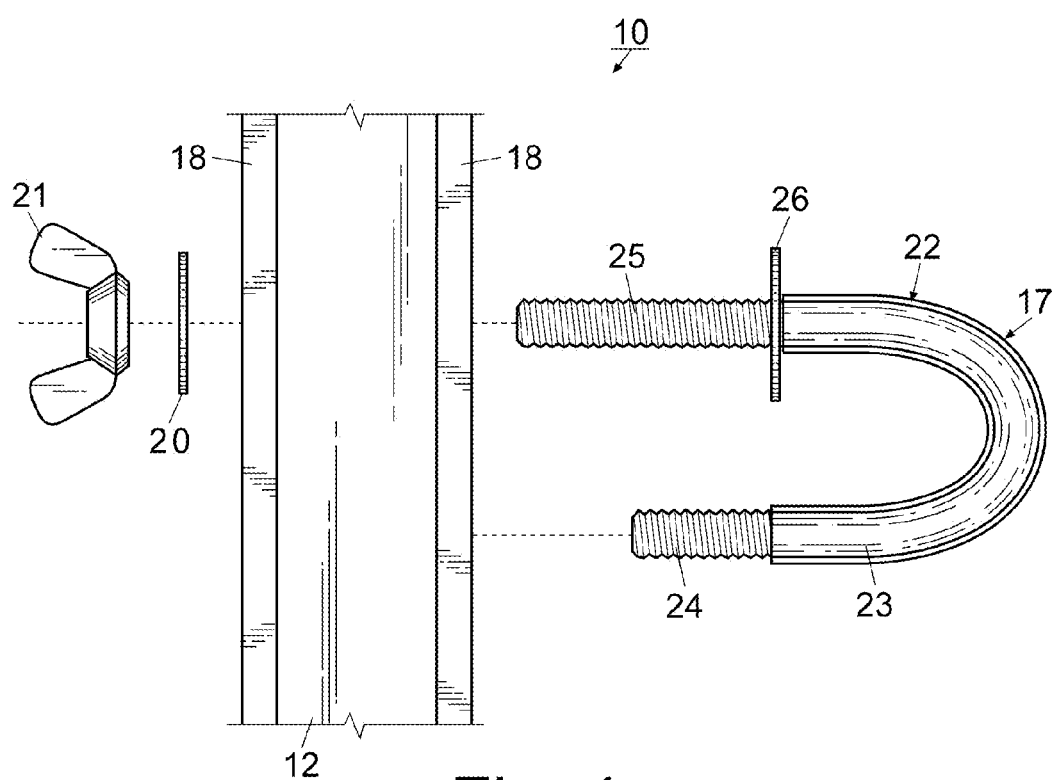
FIG. 4 demonstrates an enlarged side view of the gun mount attachment hardware, the opposing side being a mirror image thereof.
Figure 5:
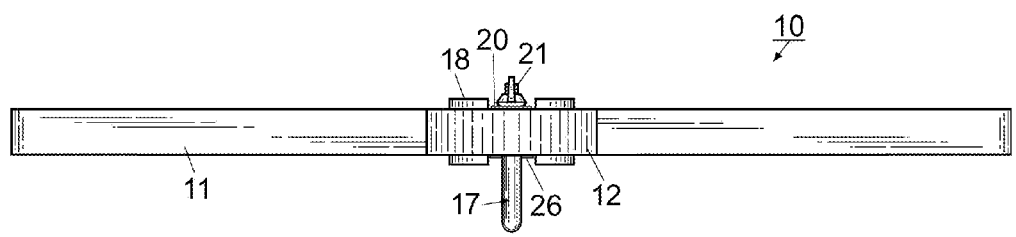
FIG. 5 illustrates a bottom plan view of the gun mount of FIG. 1.
Figure 6:
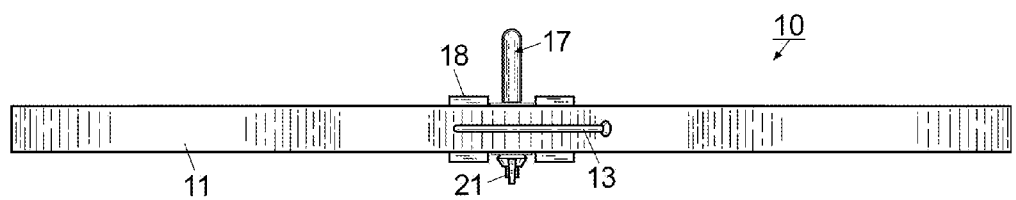
FIG. 6 features a top plan view of the gun mount of FIG. 1.

FIGS. 2 and 3 depict elevated front and rear views of gun mount 10 with garment 14 and gun 15 removed whereas bottom and top plan views are depicted in FIGS. 5 and 6 respectively. Longitudinal member 12 may be affixed, but is preferably integrally formed, to hanger 11, which is preferably formed out of wood, but other materials such as metal, plastic, or other polymers are also permissible. Hanger 11 is preferably defined by major leg 27 connected at opposing longitudinal ends to minor legs 28, 28', with each attachment defining an acute angle A of less than ninety degrees (90°), and it is major leg 27 that carries longitudinal member 12 in a substantially perpendicular orientation related thereto. As would be understood minor leg ends opposing major leg 27 are joined to one another, completing a somewhat triangular shape. Longitudinal member 12 defines central channel 16 that is preferably completely circumscribed and formed by longitudinal member 12, "closed" in the sense that the channel does not include any open longitudinally oriented walls, and sized to receive the ends of one or more mount loops 17 as illustrated in FIG. 4 and described in further detail below. Central channel 16 is represented as a singular, ovular orifice, but alternate embodiments of channel 16 (not shown) may define one or more differing sizes, shapes, and configurations. For example, instead of a singular longitudinal channel 16, a pair of shorter channels one-atop-the-other, a plurality of openings, a pair of side-by-side channels or the like may be defined within longitudinal member 12 for receiving one or more mount loops 17.

As shown in FIGS. 2, 3 and 4, both the front and rear faces of longitudinal member 12 may include one or more cushioning padding members 18, 18'. Preferably, padding members 18, 18' define the shape of a strip approximating the longitudinal length of longitudinal member 12 and are formed from polyurethane foam, although other materials capable of reducing incidental impact of gun 15 may also suffice. Padding members 18, 18' may be attached to longitudinal member 12 by fasteners, adhesives, or the like (not shown), and the distance padding members 18, 18' extend above the surface (as seen in FIGS. 5 and 6) of longitudinal member 12 may vary depending on the material utilized in padding members 18, 18', particularly as it pertains to the guns being secured. Regardless of the material of padding members 18, 18', these members are most effective when covering the greatest area of longitudinal member 12. Embodiments of padding members 18, 18' may define arcuate ends 19, 19' or other complementary shapes to correspond to the shape defined by longitudinal member 12. As would be understood the shape of longitudinal member 12 is not limited by number, length, width or thickness in relation to hanger 11 and other configurations are contemplated. For example, alternate embodiments may include a pair of longer longitudinal members 12 having a shorter width could be formed or affixed to hanger 11 proximate the hanger sides or a pair of shorter members 12 having a narrower width relative to that shown and affixed on either side with a longer, narrow member 12 positioned in the center thereof; however central positioning of member 12 relative to hanger 11 as shown in FIG. 2 is preferred for secure hanging and greater balance during use. Further, although not shown, padding members 18, 18' may come in a variety of numbers, lengths, widths or thicknesses such that coverage of longitudinal member 12 on each side is achieved without interference with central channel 16.

FIG. 4 is a magnified elevated sectional side view of mount loop 17 prior to engaging washer 20 and nut 21 via central channel 16 formed in longitudinal member 12. As illustrated in FIG. 1, mount loop 17 secures gun 15 to gun mount 10. Preferred mount loop 17 includes polymeric sleeve 22 surrounding metallic core 23 which terminates at opposing threaded ends 24 and 25 and assists in reducing impact damage between loop 17 and a gun. Mount loop 17 also preferably includes flange 26 that is oriented perpendicularly to ends 24 and 25 and prevents mount loop 17 from passing through longitudinal member 12 when engaged with nut 21. Polymeric sleeve 22 increased the coefficient of friction of metallic core 23, further adding to the stability of the engagement with gun 15 when nut 21 is tightened. It should be understood that nut 21 and washer 20 define complementary apertures (not shown) to receive threaded end 25 as is conventional, and that the representations of these components should not be limited to a certain size, diameter, or material. Threaded loop end 24 is shorter than opposing threaded loop end 25, which allows mount loop 17 to utilize two loop ends residing within central channel 16 to increase stability in securing gun 15, and to prevent inadvertent release of gun 15 from gun mount 10, while not protruding through the opposing side of longitudinal member 12, to prevent snags and increasing safety concern. As understood threaded ends 24, 25 are slideable within channel 16 and as seen in the bottom view in FIG. 5 as sleeve 22 abuts longitudinal member 12 and in the top view in FIG. 6 flange 26 abuts longitudinal member 12 preventing further insertion of loop 17 during placement. Further, as seen in FIGS. 2 and 3, padding members 18, 18' are distanced from each other to allow flange 26 and washer 20 to seat therebetween when loop mount 17 is affixed thereto. Such placement prevents inadvertent contact between a gun positioned within mount loop 17 and member 12 which may cause marring or scratches.

A method of securing and concealing a firearm may include the steps of providing longitudinal member 12 defining central channel 16 and carrying a plurality of padding members 18, 18' being affixed to hanger 11, inserting threaded loop end 24 through gun 15 trigger loop and inserting both threaded loop ends 24, 25 through central channel 16 to engage end 25 with washer 20 and nut 21, and rotatably tightening nut 21 on end 25 until nut 21 and flange 26 frictionally engage longitudinal member 12 and mount loop 17 is securely fastened as seen in FIGS. 5 and 6. Such engagement prevents mount loop 17 from vertical displacement within channel 16 such that loop 17 could be positioned anywhere within channel 16 such as proximate the top, middle or bottom and remain securely in place. Once placement of mount loop 17 with gun 15 is completed, garment 14 is placed on hanger 11, concealing gun 15 on mount 10 and hook 13 is engaged with a mounting member (not shown) such as a rack for covert storage and easy access of gun 15. The method may also include the steps of loosening nut 21 and longitudinally displacing mount loop 17, sliding mount ends 24 and 25 within central channel 16 until the desired position and orientation of gun 15 is reached, at which time nut 21 can be tightened, for example if a second gun 15 is secured on gun mount 10 as the size of longitudinal member 12 allows for placement of more than one mount loop 17 as seen for example in FIG. 1 for maintaining one or more guns as desired by the user. Although shown in FIG. 1 with a pair of mount loops 17 positioned on the same side, it should be understood mount loops 17 could be positioned on alternating sides.

The illustrations and examples provided herein are for explanatory purposes and are not intended to limit the scope of the appended claims.

I claim:

1. A gun mount comprising a longitudinal member affixed to a hanger, the hanger defined by a major leg and a pair of minor legs, each minor leg connected at opposing ends of the major leg defining an angle less than ninety degrees, the minor leg ends opposite the major leg connected to one another, the longitudinal member oriented and extending substantially perpendicular relative to the major leg, and a mount loop defining a pair of opposing ends with a sleeve positioned around the mount loop, the longitudinal member defining a closed central channel sized to receive at least one of the opposing mount loop ends.

2. The gun mount of claim 1 further comprising a padding member attached to the longitudinal member.

3. The gun mount of claim 1 further comprising a plurality of padding members attached to the longitudinal member.

4. The gun mount of claim 1 further comprising a nut and a washer sized to receive one of the opposing mount loop ends.

5. The gun mount of claim 1 comprising a flange carried by the mount loop and oriented perpendicularly to the opposing mount loop ends.

6. The gun mount of claim 1 wherein the opposing mount loop ends are threaded.

7. The gun mount of claim 1 wherein the hanger and longitudinal member are formed from wood.

8. The gun mount of claim 1 where in the hanger and the longitudinal member are integrally formed.

9. The gun mount of claim 1 comprising a garment positioned over the hanger.

10. A gun mount for securing a gun comprising a wooden hanger defining a major leg and a pair of minor legs, each minor leg connected at opposing ends of the major leg, the minor leg ends opposite the major leg connected to one another and a hook, the hanger integrally formed a longitudinal member extending perpendicularly from the major leg and wholly defining a central closed channel with a length approximating the length of the longitudinal member, and a metal mount loop with a polymeric sleeve therearound defining an opposing pair of threaded ends of differing lengths and a flange extending perpendicularly relative to the opposing mount loop ends, the central channel sized to receive the opposing pair of threaded ends, whereby the polymeric sleeve defines a greater coefficient of friction than that of the metal mount loop.

11. The gun mount of claim 10 further comprising a plurality of padding members attached to the longitudinal member in opposing relation about the central channel.

12. The gun mount of claim 11 wherein the padding members are formed from strips of polyurethane foam.

13. The gun mount of claim 12 wherein the padding members each define an arcuate end.

14. The gun mount of claim 10 further comprising a nut and a washer sized to receive the longer of the opposing mount loop ends positioned in the channel.

15. A gun mount comprising a longitudinal member affixed to a hanger, the hanger defined by a major leg and a pair of minor legs, each minor leg connected at opposing ends of the major leg defining an angle less than ninety degrees, the minor leg ends opposite the major leg connected to one another, the longitudinal member oriented and extending substantially perpendicular relative to the major leg, and a mount loop defining a pair of opposing threaded ends, the longitudinal member defining a closed central channel sized to receive at least one of the opposing mount loop ends.

16. The gun mount of claim 15 further comprising a padding member attached to the longitudinal member.

17. The gun mount of claim 15 further comprising a plurality of padding members attached to the longitudinal member.

18. The gun mount of claim 15 further comprising a nut and a washer sized to receive one of the opposing mount loop ends.

19. The gun mount of claim 15 comprising a flange carried by the mount loop and oriented perpendicularly to the opposing mount loop ends.

20. The gun mount of claim 15 comprising a sleeve positioned around the mount loop.

\* \* \* \* \*